No. 784,800. Patented March 14, 1905.

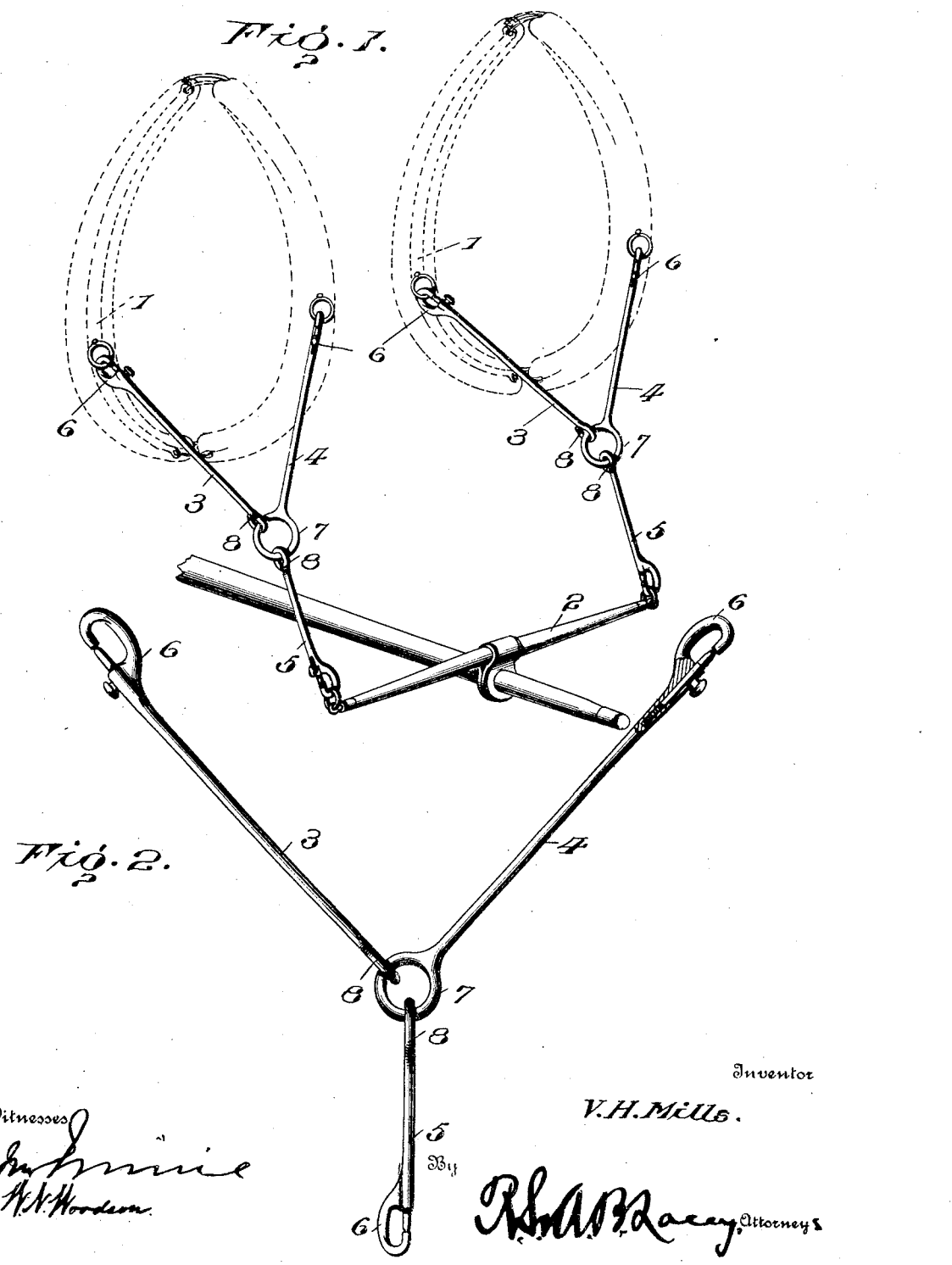

UNITED STATES PATENT OFFICE.

VIRGEL H. MILLS, OF HUBBARD, TEXAS.

BREAST-CONNECTOR.

SPECIFICATION forming part of Letters Patent No. 784,800, dated March 14, 1905.

Application filed February 20, 1904. Serial No. 194,531.

*To all whom it may concern:*

Be it known that I, VIRGEL H. MILLS, a citizen of the United States, residing at Hubbard, in the county of Hill and State of Texas, have invented certain new and useful Improvements in Breast-Connectors, of which the following is a specification.

Means heretofore generally employed for connecting the hames of harness to the neck-yoke consist wholly or in part either of straps and snap-hooks or chains and snap-hooks. Chains are preferred because of their durability and the ease of adjustment to meet varying conditions. This invention substitutes links for the chains, thereby obviating the noise attendant upon the movement of the several links one upon the other, besides reducing the weight and the cost.

The invention consists of the novel features, details of construction, and combinations of parts, which hereinafter will be more particularly set forth, illustrated, and finally claimed.

In the drawings hereto attached and forming a part of the specification, Figure 1 is a front view of a pair of harness-hames, a neck-yoke, and a breast-connector embodying the invention. Fig. 2 is a perspective view of the breast-connector disassociated from the hames and neck-yoke.

Corresponding and like parts are referred to in the following description and indicated in both views of the drawings by the same reference characters.

The hames are indicated at 1 and the neck-yoke at 2 and may be of any construction and are shown simply to illustrate the application of the invention.

The connector comprises three rods, bars, or links 3, 4, and 5, loosely joined at their inner ends and provided at their outer ends with snap-hooks 6 for engagement with the hame members and neck-yoke, substantially as indicated in Fig. 1. One of the rods or links, as 4, is provided with an integral ring 7 at its inner end, into which the rings 8 at the inner ends of the other links 3 and 5 are looped, thereby forming the loose connection, which admits of the several links or members being arranged to lie close together. By making the several links of uniform length any one may be connected to the neck-yoke and any two to the hames. The provision of the links or rods results in a comparatively light structure and the parts are at all times held extended. The weight and noise incident to the employment of chains are absent in a connector of the construction embodying the invention. The ring 7 is continuous, whereas the rings 8 are split, thereby enabling them to be fitted to the ring 7. The construction is further simplified by having the snap-hooks form an integral part of the links, as thereby loose joints or other form of connection is avoided.

The breast-connector is used in the ordinary way, two of the members being engaged with the rings of the harness-hames and the other member being attached to the neck-yoke in any determinate way.

Having thus described the invention, what is claimed as new is—

A breast-connector composed of a rod or link having an integral snap-hook at its outer end and a solid continuous ring integral with its inner end, and two other similar links or rods provided with integral snap-hooks at the outer ends thereof and having integral split rings at their inner ends, the said split rings being engaged with the continuous ring of the first-mentioned link or rod.

In testimony whereof I affix my signature in presence of two witnesses.

VIRGEL H. MILLS.

Witnesses:
J. C. KILLOUGH,
J. H. T. MILLS.